(12) United States Patent
Schneeberger et al.

(10) Patent No.: US 7,765,711 B2
(45) Date of Patent: Aug. 3, 2010

(54) LINEAR GUIDING SYSTEM COMPRISING A POSITION MEASURING DEVICE

(75) Inventors: Hans-Martin Schneeberger, Langenthal (CH); Ernst Mischler, Roggwil (CH); Lutz Ramonat, Offenburg (DE)

(73) Assignee: Schneeberger Holding AG, Roggwil (CH)

( * ) Notice: Subject to any disclaimer, the term of this patent is extended or adjusted under 35 U.S.C. 154(b) by 10 days.

(21) Appl. No.: 11/988,263

(22) PCT Filed: Jun. 26, 2006

(86) PCT No.: PCT/CH2006/000343

§ 371 (c)(1),
(2), (4) Date: Mar. 11, 2009

(87) PCT Pub. No.: WO2007/003065

PCT Pub. Date: Jan. 11, 2007

(65) Prior Publication Data

US 2010/0031524 A1 Feb. 11, 2010

(30) Foreign Application Priority Data

Jul. 6, 2005 (EP) .................................. 05405427

(51) Int. Cl.
*G01D 5/347* (2006.01)
(52) U.S. Cl. ............................... 33/706; 33/707; 33/708
(58) Field of Classification Search ........... 33/706–710, 33/1 M, 1 PT, 503, 558, 559, 561
See application file for complete search history.

(56) References Cited

U.S. PATENT DOCUMENTS

| 4,831,888 | A | * | 5/1989 | Tessier et al. | .......... 73/862.541 |
|---|---|---|---|---|---|
| 5,289,088 | A | | 2/1994 | Andoh | |
| 5,987,768 | A | | 11/1999 | Freitag | |
| 6,769,195 | B2 | * | 8/2004 | Huber et al. | .................. 33/706 |
| 7,096,595 | B2 | * | 8/2006 | Greubel | ........................ 33/706 |
| 2002/0066201 | A1 | * | 6/2002 | Boge et al. | .................... 33/706 |
| 2005/0076526 | A1 | * | 4/2005 | Greubel | ....................... 33/706 |

(Continued)

FOREIGN PATENT DOCUMENTS

DE 10064734 A1 7/2002

(Continued)

*Primary Examiner*—Yaritza Guadalupe-McCall
(74) *Attorney, Agent, or Firm*—Townsend and Townsend and Crew, LLP

(57) ABSTRACT

Disclosed is a linear guiding system (1) comprising at least one guide rail (2), at least one guide carriage (3) that is supported on the guide rail and can be moved therealong, and a device (5) for measuring a distance traveled by the guide carriage relative to the guide rail and/or determining a position of the guide carriage relative to the guide rail. The measuring device (5) encompasses a measuring rule (10) and a measuring head (21) that is provided with at least one sensor for scanning the measuring rule (10). The measuring rule extends in the longitudinal direction of the guide rail while being arranged along or on a surface (2.1) of the guide rail (2) facing the support zone (40) of the guide carriage (3). A cavity (25) for accommodating the measuring head is embodied in the guide carriage. Said cavity (25) is configured entirely or partly outside the support zone (40) while the measuring head (21) is disposed entirely or partly in the cavity (25) and entirely or partly outside the support zone (40).

12 Claims, 4 Drawing Sheets

U.S. PATENT DOCUMENTS

| | | | |
|---|---|---|---|
| 2007/0107247 A1* | 5/2007 | Meissner et al. | 33/707 |
| 2007/0180724 A1* | 8/2007 | Pucher et al. | 33/706 |
| 2007/0186430 A1* | 8/2007 | Brumbaugh | 33/706 |
| 2008/0047157 A1* | 2/2008 | Takayama et al. | 33/706 |
| 2009/0064523 A1* | 3/2009 | Reusing | 33/706 |
| 2010/0066298 A1* | 3/2010 | Coleman | 318/652 |

FOREIGN PATENT DOCUMENTS

| | | |
|---|---|---|
| WO | WO 91/16594 A | 10/1991 |

* cited by examiner

LINEAR GUIDING SYSTEM COMPRISING A POSITION MEASURING DEVICE

CROSS-REFERENCE TO RELATED APPLICATIONS

This application is a National Stage of International Application No. PCT/CH2006/000343, filed Jun. 26, 2006, and which claims the benefit of European Patent Application No. 05405427.5, filed Jul. 6, 2005, the disclosures of both applications being incorporated herein by reference.

The invention concerns a linear guiding system with a measuring device for the measurement of a path traveled by a moving guide carriage relative to a guide rail and/or for the determination of a position of the guide carriage relative to the guide rail.

From DE 197 42 081 a linear guiding system is known, which guiding system has a guide carriage supported via rolling bodies on a guide rail and that can be moved along the guide rail, and a measuring device for the measurement of a path traveled by the guide carriage. The measuring device comprises a measuring rule and a measuring head with at least one sensor to scan the measuring rule, wherein the measuring rule is arranged on a surface of the guide rail facing towards the guide carriage, and in the guide carriage a cavity is configured for the accommodation of the measuring head. The cavity is a groove, which is essentially configured in the centre of the guide carriage, and in particular in the centre of the support zone of the guide carriage, and moreover represents an opening passing through the guide carriage (at right angles to the guide rail). A cavity of this kind leads to a reduced load-bearing capacity, stiffness and/or service life of the linear guiding system and on account of the reduction of stiffness—dependent on a load acting on the guide carriage—impairs the accuracy of measurement of the measuring device.

From WO 91/16594 a linear guiding system with a guide carriage that can be moved along a guide rail and a measuring device for the measurement of a path traveled by the guide carriage is known, which measuring device comprises a measuring rule arranged on the guide rail and a measuring head to scan the measuring rule, wherein the measuring head is disposed in a separate housing, which is mounted on an end surface of the guide carriage (pointing in the direction of movement of the guide carriage). This linear guiding system has the disadvantage that for the moving part of the linear guiding system (i.e. for the guide carriage and the measuring head in conjunction with the housing containing the measuring head) more space is required in the direction of movement (in comparison with a linear guide without a corresponding measuring head) and thus the available travel of the linear guiding system in the direction of movement of the guide carriage is reduced. Both the measuring head and also the housing must be positioned with tight tolerances relative to the guide carriage in order to ensure a high accuracy of measurement by the measuring device. The mounting of the measuring device is therefore complex and thus expensive (conditioned by the number of individual parts to be installed, by the tolerances to be adhered to during mounting, etc.).

The object of the invention is to avoid the disadvantages cited and to provide a linear guiding system with a guide carriage that can be moved along a guide rail, and with a measuring device for the measurement of a path traveled by the guide carriage relative to the guide rail, such that the guide carriage together with the measuring device can be implemented in a compact form of construction and can be manufactured with as little mounting complexity as possible and such that the linear guiding system has as high a load-bearing capacity and/or stiffness as possible.

This object is achieved by a linear guiding system with the features of Claim 1.

The linear guiding system according to the invention comprises at least one guide rail, at least one guide carriage that is supported via rolling bodies on the guide rail and can be moved along the guide rail, and a measuring device for the measurement of a path traveled by the guide carriage relative to the guide rail and/or for the determination of a position of the guide carriage relative to the guide rail. The measuring device comprises a measuring rule and a measuring head with at least one sensor to scan the measuring rule, wherein the measuring rule extends in the longitudinal direction of the guide rail and is arranged along or on a surface of the guide rail facing towards the support zone of the guide carriage, and in the guide carriage a cavity is configured for the accommodation of the measuring head.

It is assumed that the guide carriage consists of a base body that is determined for the accommodation of a load acting on the guide carriage, and the totality of all rolling bodies (and if necessary other components that are directly required for the guidance of the rolling bodies). In this connection a "support zone" is to be considered as the part of the base body that lies directly between the rolling bodies and accordingly is supported along the edge by the rolling bodies, and via the rolling bodies by the guide rail. In this connection components that are attached to the base body and do not serve to accommodate the load are not to be seen as elements of the guide carriage. The stiffness of the guide carriage is essentially determined by its stiffness in the region of the support zone.

The above-cited object is achieved according to the invention in that the cavity is configured partially outside the support zone, and the measuring head is arranged entirely or partially in the cavity, and partially outside the support zone.

In that the measuring head is arranged in a cavity in the guide carriage, the guide carriage can be compactly constructed (with regard to its extent in the direction of movement of the guide carriage and its height of construction). In addition the cavity enables an accurate positioning of the measuring head (without complex adjustment) and an attachment of the measuring head directly to the guide carriage (i.e. without an additional housing and/or without additional intermediate parts between the measuring head and the guide carriage). This simplifies the mounting of the guide carriage in conjunction with the measuring device and simplifies the mounting of the measuring head relative to the measuring rule, such that a high accuracy of measurement of the measuring device is achieved.

In that the cavity is configured partially outside the support zone of the guide carriage, the stiffness of the guide carriage is not, or relatively little, weakened by the cavity (in comparison to a guide carriage without a cavity). The linear guiding system has therefore a relatively high stiffness and a relatively high load-bearing capacity, even if the measuring head is mounted in the cavity. The latter also simplifies the achievement of a high accuracy of measurement of the measuring head when scanning the measuring rule, and provides the basis for a particularly long service life and reliable operation of the linear guiding system.

In one embodiment of the linear guiding system according to the invention the cavity is arranged at a front or rear end of the guide carriage relative to the direction of movement of the guide carriage. In this case the cavity that is required for the accommodation of the measuring head can in many cases be configured to be particularly small (which reduces the stiffness of the guide carriage, i.e. of the linear guiding system, by a particularly small amount). This applies in particular if the height of the measuring head is less than the height of the guide carriage and the measuring head is so constructed and the cavity in the guide carriage is so configured that the measuring head can be completely embedded in the guide carriage. If under these circumstances the cavity is arranged at the front or rear end of the guide carriage, then, for example for the accommodation of a cable that provides a connection between the measuring head and external ports (for example for a power supply, or for processing of sensor signals), a particularly small amount of space is required, since the cable in the region of the guide carriage must only be led over a particularly short distance (between the measuring head and the front or rear end of the guide carriage). Depending on the size of the distance between the measuring head and an end or edge of the guide carriage the cable can be led out of the guide carriage via either a particularly short groove (for the guidance of the cable) or without a groove of this kind. Since such a groove in all cases can reduce the load-bearing capacity of the linear guiding system, any reduction of the load-bearing capacity is avoided or at least substantially reduced by means of such an arrangement of the measuring head.

In another embodiment the cavity is configured such that it has an opening on a side of the guide carriage facing away from the guide rail. The opening can be dimensioned such that the measuring head can be mounted in the opening or through the opening from the side of the guide carriage facing away from the guide rail. Furthermore the opening can serve for the passage of cable connections. These measures enable a simple installation and removal of the measuring head and thus simplify the mounting and maintenance of the measuring head.

In another embodiment provision is made that the measuring rule is arranged on an edge of a surface of the guide rail facing towards the guide carriage and/or in a region between a central region of this surface and an edge of the surface. In this case the measuring rule is respectively displaced laterally relative to a central axis (in the longitudinal direction) of the guide rail. Correspondingly the cavity for the accommodation of the measuring head and the measuring head in the guide carriage is likewise displaced laterally to the central axis of the guide rail. This variant offers a plurality of advantages with regard to the design of the measuring device.

As a rule a plurality of holes are configured in a central region of the guide rail (in particular in the surface of the guide rail facing towards the support zone of the guide carriage), which holes serve for the attachment of the guide rail to a foundation, or to another base, by means of suitable means of attachment (for example bolts or rivets). In this case an arrangement of the measuring rule in the central region of the surface is subject to complications if a high accuracy of measurement of the measuring device is to be ensured. On account of the large space requirement of the holes it is, for example, difficult to configure the measuring rule without interruptions over the entire length of the surface. The latter would only be compatible with a mounting (attachment to a foundation) of the guide rail if the measuring rule were to be arranged on the guide rail only after a mounting of the guide rail, and were to be removed once again before any demounting of the guide rail.

The previously cited embodiment now offers the advantage that the measuring rule can be configured without interruptions over the total length of the surface, even if holes for the attachment of the guide rail are present in the central region of the guide rail. For this purpose, a surface can be used for the measuring rule that is bounded on the one side by the holes and on the other side by a side edge of the guide rail. In this case the measuring rule can be permanently arranged on the guide rail (independently of any mounting or demounting of the guide rail).

In the previously cited case the attachment of the guide rail has a further effect that is significant for the accuracy of measurement of the measuring device. The surface of the guide rail can namely be warped during the attachment of the respective means of attachment in the vicinity of the means of attachment. Correspondingly the height of the guide rail alters (depending on the distance from the respective means of attachment). Here the alteration of the height is least at the sides of the rail, as well as in the centre between two means of attachment. By means of an arrangement of the measuring rule at the edge or in the vicinity of the edge of the guide rail, in the case of the previously cited embodiment it is achieved that the measuring rule is configured in a region of the guide rail that is deformed by a particularly small amount during any mounting of the guide rail. In this case the state of the measuring rule during mounting is influenced particularly little (if at all). From this a higher accuracy of measurement of the measuring device results.

As a rule the measuring rule includes a plurality of marks, each of which represents an item of location information. With regard to the marks it should here simply be assumed that different marks are to be arranged at different locations. Measuring rules with marks of this kind can be implemented conventionally in various ways (for example by the processing of suitable materials with mechanical and/or magnetic and/or optical and/or chemical means).

Accordingly it is assumed that the measuring head sensor in question is suitable for registering the respective marks in order to enable scanning of the measuring rule and recording of the items of location information represented by the respective marks. Depending on the constitution of the marks various types of sensors are accordingly suitable for this purpose, for example sensors for scanning the marks with magnetic and/or optical and/or mechanical and/or electrical and/or acoustic means. Sensors of this kind can scan the measuring rule in a non-contacting manner if necessary, or can be brought into contact with the measuring rule for scanning purposes.

The measuring rule can have one or a plurality of tracks of marks with different functions in each case: one or a plurality of incremental tracks and/or a reference track comprising one or a plurality of reference marks and/or a track with an absolute code mark pattern extending along the guide rail (i.e. with a track of marks that unambiguously identify the location in question, and for each location codify an absolute position information). The reference marks in question unambiguously identify in each case a specific location and therefore represent in each case an absolute item of location information. The incremental track comprises a plurality of marks arranged along a prescribed path, which are separated from one another by prescribed distances and which do not need to hold any absolute location information. A scanning of a series of marks on the incremental track accordingly supplies information concerning the path traveled during scanning.

If the measuring rule has an incremental track and a reference track, then a sensor of the measuring device can be configured such that both the incremental track and also the reference track can be scanned with the sensor. This is particularly advantageous if the reference marks and the marks of the incremental track are arranged in a common track or lie adjacent to one another at right angles to the direction of movement of the guide carriage, such that the sensor—in an appropriate arrangement—can register both the reference marks and also the marks of the incremental track.

Alternatively the measuring head can have a first sensor for the scanning of the incremental track and a second sensor for the scanning of the reference track.

Further details of the invention and, in particular, exemplary embodiments of the linear guiding system according to the invention are elucidated in what follows with the aid of the accompanying schematic drawings. In the drawings.

Figure 1:
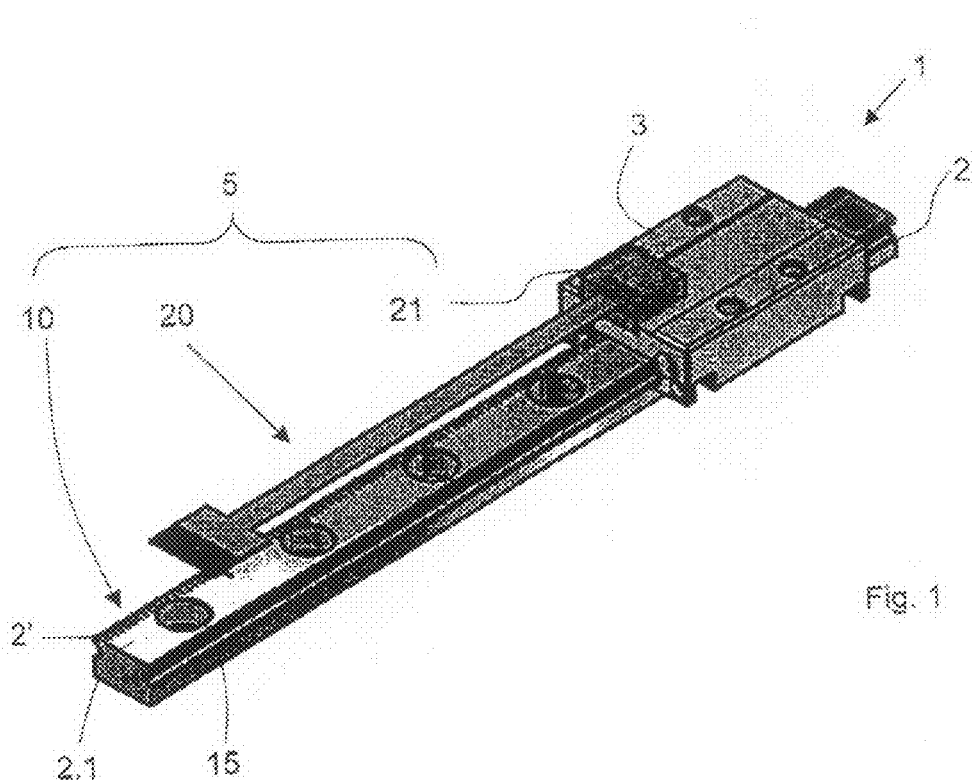
FIG. 1 shows a perspective representation of a first embodiment of the linear guiding system with a guide rail, a guide carriage and a measuring device, which comprises a measuring rule and a scanning device for scanning of the measuring rule.

FIG. 1 shows a linear guiding system 1 according to the present invention with a guide rail 2, a guide carriage 3 that is arranged on the guide rail 2 and can be moved along the guide rail 2, and a measuring device 5 for the measurement of a path traveled by the guide carriage 3 relative to the guide rail 2 and/or for the determination of a position of the guide carriage 3 relative to the guide rail 2.

Figure 7:
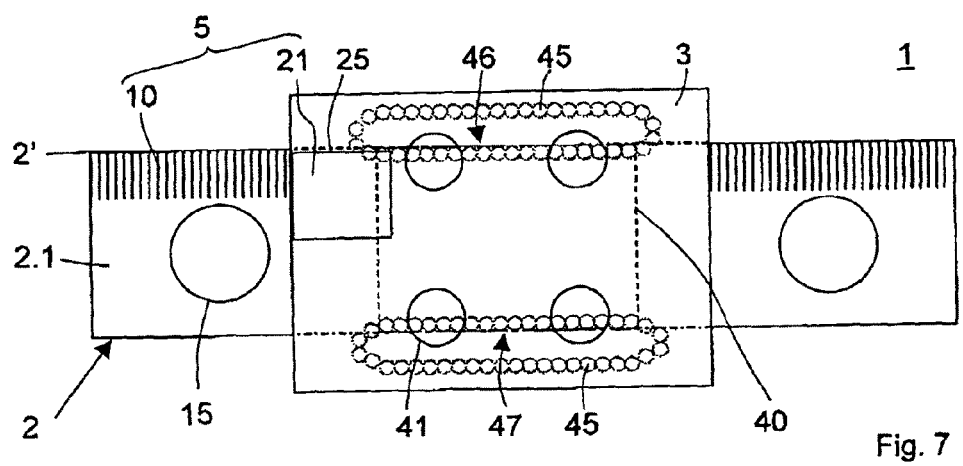
FIG. 7 shows the guide carriage according to FIG. 1 with a representation of the support zone.

The guide carriage 3 is supported on the guide rail 2 via rolling bodies, which—as is explained in conjunction with FIG. 7—bound a support zone 40 of the guide carriage 3.

The measuring device 5 comprises a measuring rule 10 and a scanning device 20 with a measuring head 21 for scanning of the measuring rule 10.

Figure 2:
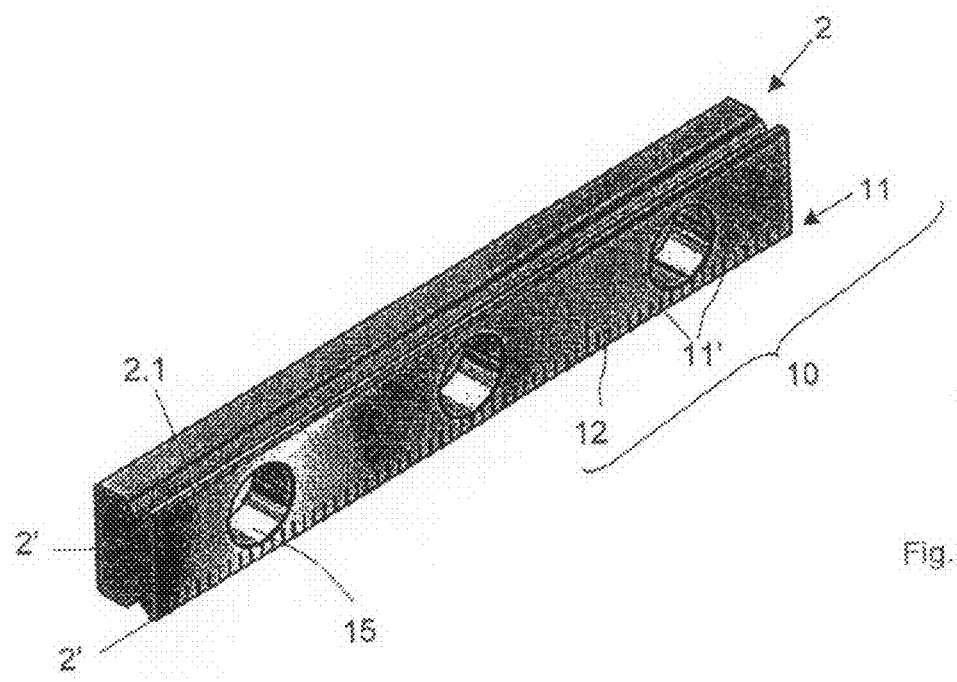
FIG. 2 shows a section of the guide rail according to FIG. 1 with a (schematically represented) measuring rule of the measuring device.

As shown by FIGS. 1 and 2, the measuring rule 10 is configured on an (upper) surface 2.1 of the guide rail 2 facing towards the support zone 40 of the guide carriage 3, and in particular on an edge 2' of the guide rail 2. In the central region of the guide rail 3 holes 15 are present for the attachment of the guide rail 2 to mounting elements that are not represented here. The measuring rule 10 requires space essentially in a strip-shaped region of surface between the edge 2' and the holes 15, and can therefore be configured as a linear measuring rule, which extends (without interruption) over the total length of the guide rail 2.

The measuring rule 10 is configured in the present embodiment such that an optical sensor is able to scan it. Alternatively, needless to say, it is also possible in the context of the present invention to implement the measuring rule 10 such that it is suitable for another scanning method, e.g. for a mechanical scanning process, a magnetic scanning process, or even an acoustic scanning process.

Figure 3:
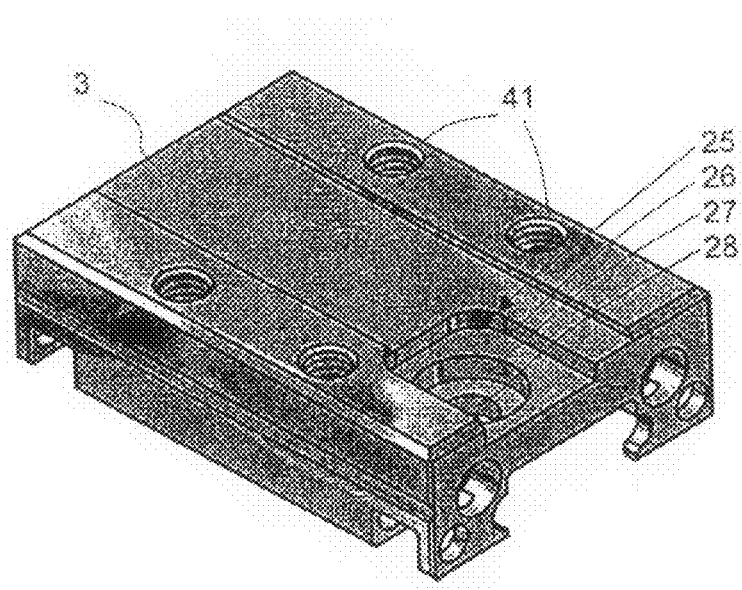
FIG. 3 shows the guide carriage according to FIG. 1 with a cavity for the accommodation of a measuring head for scanning of the measuring rule.

FIG. 3 shows the guide carriage 3 in detail (without the rolling bodies and guides for the rolling bodies). The guide carriage 3 is configured in a conventional manner. On its surface, namely on the upper surface of the guide carriage 3, a cavity 25 is present, which serves to accommodate the measuring head 21. The cavity 25 is configured in a first (upper) layer as a groove 26. Lying underneath—thus in a second layer so to speak—the cavity can again be discerned as a hole 27, but not a hole that passes through the guide carriage 3. In the present embodiment the twin-level design of the cavity 25 is on the one hand matched to the intended shape of the measuring head 21, but on the other hand leads to optimal stability of the guide carriage 3 in conjunction with the measuring head 21. It has in fact been demonstrated that an arrangement of a measuring head 21 in a cavity that is open in the downward direction is disadvantageous for the stability of the linear guiding system.

In order to enable optical scanning of the measuring rule 10 with the measuring head 21, the cavity 25 includes a further hole 28 that does pass through the guide carriage 3. The hole 28 is maintained as small as possible in order to ensure a high level of mechanical stability for the guide carriage 3. The guide carriage 3 has furthermore 4 threaded holes 41, in order to be able to attach a load to the guide carriage 3, which load is to be guided with the linear guiding system 1.

Figure 4:
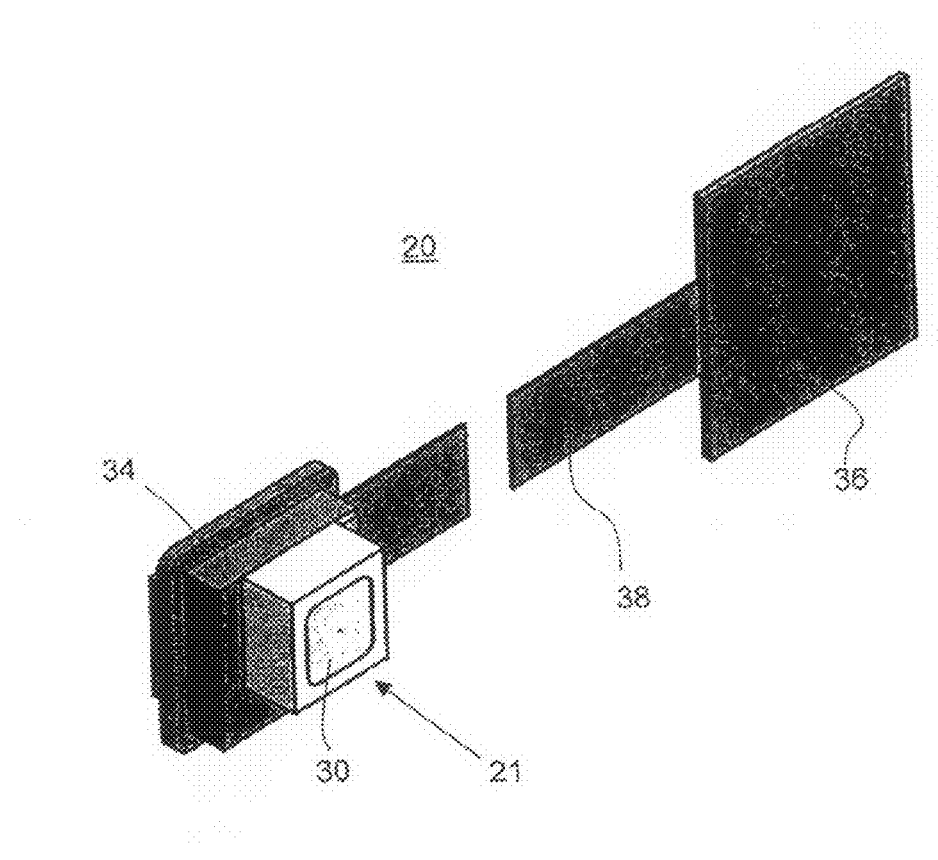
FIG. 4 shows the scanning device according to FIG. 1 from another perspective.

FIG. 4 shows details of the scanning device 20. This comprises:

the measuring head 21, which consists of an optical sensor 30 and a sensor attachment element 34, whose outer contour is matched to the shape of the groove 26;

a supply 36, which is connected via a cable 38 (or alternatively via a printed circuit board) with the measuring head 21, and in addition can be connected to a (not represented) control unit, on the one hand in order to ensure a supply of energy to the measuring head 21, and on the other hand to enable an exchange of control and measurement signals between the measuring head 21 and the control unit.

The sensor 30 comprises (not represented) a light source for the illumination of the measuring rule 10, an optical detector to register the light back-scattered from the measuring rule 10, and an electronic circuit for the processing of detector signals, which enables a registration of marks on the measuring rule 10. Output signals from the measuring head 21 can finally be converted by the control unit into data that specify a path traveled by the guide carriage 3 relative to the guide rail 2 and/or the instantaneous position of the guide carriage 3 relative to the guide rail 2.

Figure 5:
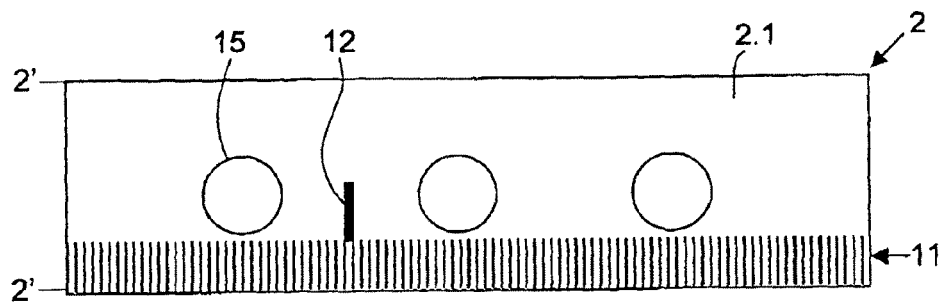
FIG. 5 shows a schematic representation of the measuring rule according to FIG. 1 with a reference track and an incremental track.

As FIGS. 2 and 5 show, the measuring rule 10 comprises an incremental track 11 running parallel to the edge 2' of the surface 2.1 with a large number of (equidistant) marks 11' and a reference track with reference marks 12. In the present case the reference marks 12 are arranged alongside the incremental track 11. The measuring head 21 is arranged on the guide carriage 3 such that both the marks 12 of the reference track and the marks 11' of the incremental track 11 can be scanned by the measuring head 21.

In the present case a reference mark 12 is arranged in the central region of the guide rail 2 (approximately in the centre) between two holes 15. This arrangement is particularly appropriate for narrow guide rails 2 that are not significantly wider than the diameter of the holes and accordingly offer little space for the arrangement of the measuring rule 10.

Figure 6:
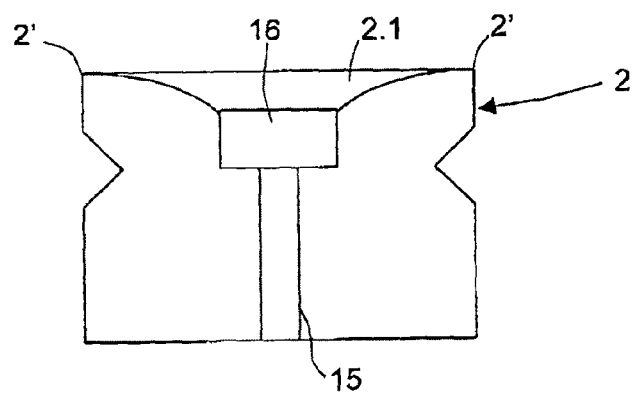
FIG. 6 shows a schematic representation of a warp of a surface of the guide rail by means of attachment (wherein the magnitude of the deformation of the surface is represented in an exaggerated manner)

FIG. 6 makes clear a further advantage of this arrangement. FIG. 6 shows the guide rail 2 in cross-section for the case in which the guide rail 2 is attached with means of attachment 16 (for example bolts) to a foundation (not represented). As a result of the attachment the surface (surface 2.1) of the guide rail 2 can be deformed, particularly in the vicinity of the holes 15 and/or the means of attachment 16 (the corresponding deformation is represented in FIG. 6 in an exaggerated manner).

Here the corresponding alteration of the height of the guide rail is least at the edge 2' and also in the mid-position between two holes 15. By an arrangement of the measuring rule 10 in the vicinity of the edge 2' it can be achieved that the measuring rule (in particular the spatial position of the marks 11' of the incremental track 11) is influenced by the attachment by a particularly small amount. The same applies to the reference marks 12, which are arranged in the mid-position between two holes 15. The measures cited therefore lead to a higher accuracy of measurement of the measuring device 5.

To utilise this advantage it is not necessary to arrange the measuring rule 10 directly on the edge 2'. As a rule the advantage can clearly be perceived if the measuring rule 10 has a distance from the edge 2' of the guide rail 2 that is less than 25% of the width of the guide rail 2.

FIG. 7 represents the linear guiding system 1 in a plan view and in particular shows the arrangement of the measuring head 21 and correspondingly the arrangement of the cavity 25 relative to the support zone 40 of the guide carriage 3 (the region of the guide carriage 3 that forms the support zone 40 is represented in FIG. 7 by a dashed rectangle). The guide carriage 3 is conventionally supported via circulating (around a closed track) rolling bodies 45 (for example balls) on the edges 2' of the guide rail 2, and is guided in the longitudinal direction of the guide rail 2. The guide carriage 3 has on opposite sides a first rolling body circulation 46 and a second rolling body circulation 47.

Those rolling bodies 45 of the rolling body circulations 46 and 47, via which the guide carriage is supported on the guide rail 2, can be subjected to a load acting on the guide carriage 3, and thus support the guide carriage (while the other rolling bodies do not act in a supportive manner). The region of the guide carriage 3 that lies directly between the supporting rolling bodies forms the support zone 40. In the present case the support zone 40 forms a sub-region of the guide carriage 3. As FIG. 7 shows the cavity 25 is partially configured outside the support zone 40 and the measuring head 21 is arranged in the cavity 25 partially outside the support zone 40. As already explained, this is advantageous with regard to the load-bearing capacity, stiffness and service life of the linear guiding system 1.

Figure 8:
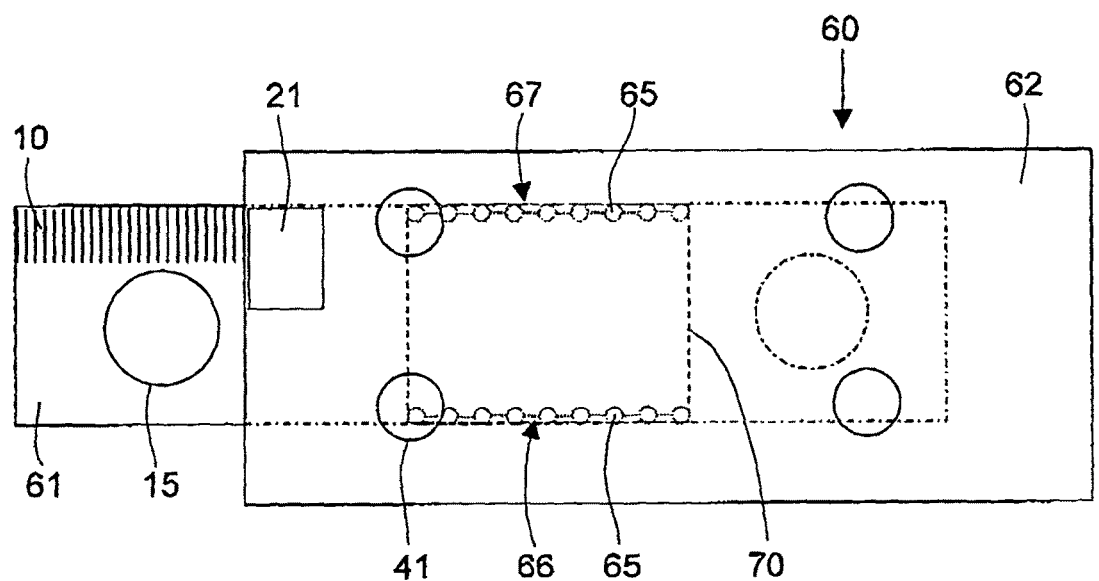
FIG. 8 shows a schematic representation of a second embodiment of the linear guiding system.

FIG. 8 shows a linear guiding system 60 with a guide rail 61 and a guide carriage 62 that is supported on the guide rail 61 via rolling bodies 65 (for example spheres). For the measurement of the path travelled by the guide carriage 62 relative to the guide rail 61 the measuring device 5 according to FIGS. 1 and 4 is provided, wherein in FIG. 8 just the measuring head 21 and a section of the measuring rule 10 of the measuring device 5 are represented. In contrast to the linear guiding system 1 the rolling bodies 65 of the linear guiding system 62 do not form any rolling body circulation. Instead the rolling bodies 65 are arranged in two rows 66 and 67 along opposite edges of the guide rail 61 and are held in conventional (not represented) cages such that adjacent rolling bodies 65 are in each case a prescribed distance apart. The region of the guide carriage 62 that lies directly between the rolling bodies of the rows 66 and 67 forms the supporting zone 70 (in FIG. 8 identified by a dashed rectangle) of the guide carriage 62. In contrast to the linear guiding system 1, in the case of the linear guiding system 60 the position of the supporting zone 70 alters relative to the guide carriage 62 if the guide carriage 62 is moved in the longitudinal direction of the guide rail 61. According to FIG. 8 of the measuring head 21 is arranged in a cavity (not visible) in the guide carriage 62 at one end of the guide carriage 61 such that the cavity—dependent on the position of the guide carriage 62—is configured entirely or partially outside the support zone 70 and the measuring head 21 is arranged in the cavity entirely or partially outside the support zone 70. The same advantages result from this as in the case of the linear guiding system 1.

In the context of the present invention the guide carriages 3 and/or 62 can be supported by means other than rolling bodies on the respective guide rails, for example via sliding surfaces and/or sliding supports.

The invention claimed is:

1. A linear guiding system (1, 60) with at least a guide rail (2, 61), at least one guide carriage (3, 62) that is supported via rolling bodies (45, 65) on the guide rail and can be moved along the guide rail, and a measuring device (5) for the measurement of a path traveled by the guide carriage relative to the guide rail and/or for the determination of a position of the guide carriage relative to the guide rail, which measuring device comprises a measuring rule (10) and a measuring head (21) with at least one sensor (30) for scanning of the measuring rule, wherein the measuring rule extends in the longitudinal direction of the guide rail and is arranged along or on a surface (2.1) of the guide rail facing towards the support zone (40, 70) of the guide carriage, and in the guide carriage (3) a cavity (25) is configured for the accommodation of the measuring head (21), characterized in that the cavity (25) is configured partially outside the support zone (40, 70), and the measuring head (21) is arranged entirely or partially in the cavity (25) and partially outside of the support zone (40, 70).

2. The linear guiding system according to claim 1, wherein the cavity (25) is arranged at a front or rear end of the guide carriage (3, 62) relative to the direction of movement of the guide carriage.

3. The linear guiding system according to claim 1, wherein the cavity (25) has an opening (26, 27, 28) on a side of the guide carriage (3) facing away from the guide rail (2).

4. The linear guiding system according to claim 1 wherein the measuring rule (10) has one or a plurality of incremental tracks (11) and/or a reference track comprising one or a plurality of reference marks (12) and/or a track with an absolute code mark pattern extending along the guide rail for the codification of an absolute position information.

5. The linear guiding system according to claim 4, wherein the measuring head (21) comprises a sensor (30), which is arranged such that both the incremental track (11) and the reference track can be registered with the sensor (30).

6. The linear guiding system according to claim 4, wherein the measuring head (21) comprises a first sensor for scanning of the incremental track (11) and a second sensor for scanning of the reference track.

7. The linear guiding system according to claim 4 wherein the measuring rule is arranged at an edge (2') of the surface (2.1) and/or between a central region (15) of the surface (2.1) and an edge (2') of the surface (2.1).

8. The linear guiding system according to claim 7, wherein the measuring rule (10) has a distance from the edge (2') that is less than 25% of the width of the guide rail (2).

9. The linear guiding system according to claim 7, wherein a central region of the guide rail holes (15) are configured for the attachment of the guide rail (2, 61).

10. The linear guiding system according to claim 4, wherein at least one reference mark (12) is arranged between two holes (15).

11. The linear guiding system according to claim 1, wherein a subset of the rolling bodies (45) is arranged in a first rolling body circulation (46) and another subset of the rolling bodies (45) is arranged in a second rolling body circulation (47) and the guide carriage (3) is supported on one edge of the support zone (40) by rolling bodies (45) of the first rolling body circulation (46) and on another edge of the supporting zone (40) by rolling bodies (45) of the other rolling body circulation.

12. The linear guiding system according to claim 1, wherein the rolling bodies (65) are arranged between the guide carriage (62) and the guide rail (61) in two rows (66, 67) such that the support zone (70) of the guide carriage (62) alters its position relative to the guide carriage (62) with a movement of the guide carriage (62) in the longitudinal direction of the guide rail (61).

* * * * *